April 18, 1967  R. D. KERESTURY  3,314,512
COUPLING DEVICE EMPLOYING FLEXIBLE HUB ASSEMBLY
Filed July 2, 1965  5 Sheets-Sheet 1

INVENTOR
RICHARD D. KERESTURY
BY Joseph W. Malleck
ATTY.

April 18, 1967   R. D. KERESTURY   3,314,512
COUPLING DEVICE EMPLOYING FLEXIBLE HUB ASSEMBLY
Filed July 2, 1965   5 Sheets-Sheet 3

INVENTOR
RICHARD D. KERESTURY
BY Joseph W. Malleck
ATTY.

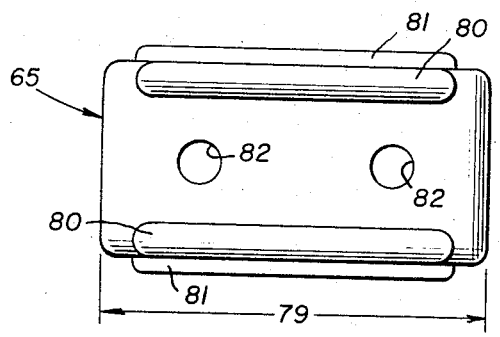
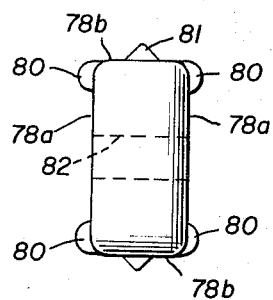
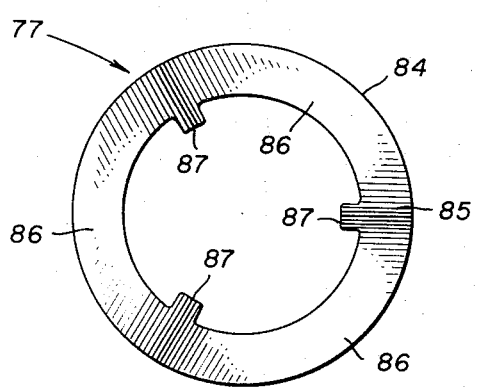
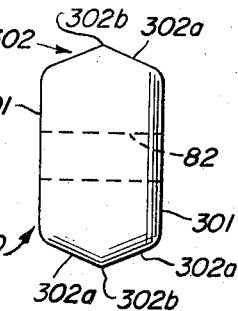
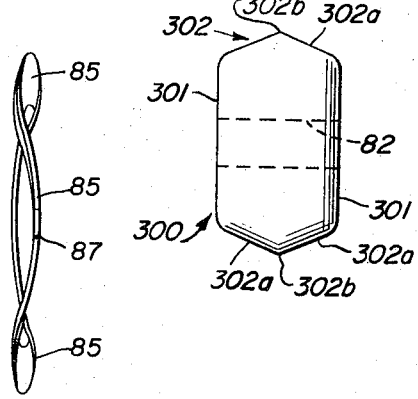
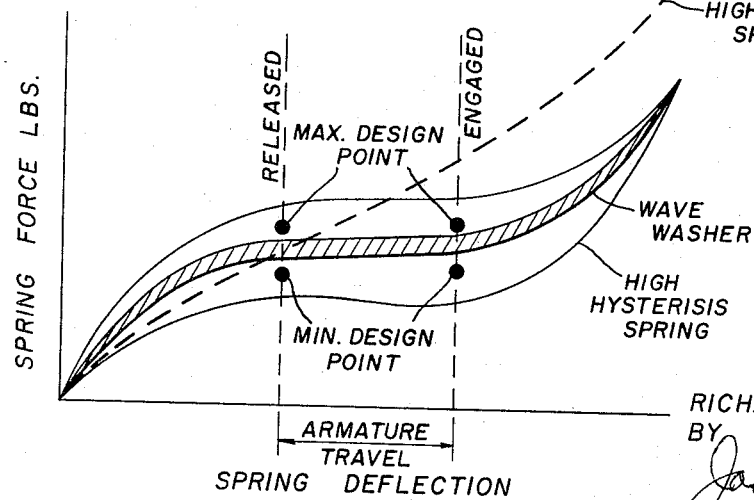
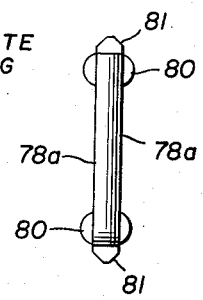

United States Patent Office 3,314,512
Patented Apr. 18, 1967

3,314,512
COUPLING DEVICE EMPLOYING FLEXIBLE
HUB ASSEMBLY
Richard D. Kerestury, Lombard, Ill., assignor to Borg-Warner Corporation, Chicago, Ill., a corporation of Illinois
Filed July 2, 1965, Ser. No. 469,176
17 Claims. (Cl. 192—84)

This invention, in its broadest espect, relates to rotary driven members and more particularly to a flexible hub assembly for mounting an armature of an electro-magnetic device used for purposes as a clutch or brake.

One application of electro-magnetic devices, for which the preferred embodiment described herein is adapted, is to control the rotary power transmitted to an automotive air-conditioner compressor. An electro-magnetic clutch typically comprises a core ring element which directly receives rotative input power through such means as a belt thereby characterizing the ring element as a pulley wheel; a driven armature element is coupled to the compressor shaft and is adapted for inter-engagement with the ring element. The armature and ring elements are substantially comprised of ferro-magnetic material and a selectively energizable coil is carried internally by the ring element to stimulate a flux path for promoting attraction and thereby inter-engagement of the elements.

Rotary compressors and the like have considerable torsional fluctuations and a high peak torque demand which results in severe engagement shock to known types of clutches utilized to connect the compressor load. This problem must be compensated for and overcome if the clutch structure is to experience a successful degree of durability and an acceptable noise level of operation.

Limitations are placed upon the solution to the above problem. First, space restrictions are dictated by modern automobile requirements; incorporation of a greater degree of flywheel inertia into the core ring element by increasing its mass has provided a degree of success in helping to dampen the peak torque pulsations inherent in the operation of such compressors, but if the clutch is to have a relatively small package size such approach is limited. Secondly, the armature must undergo axial movement for purposes of retraction of the clutch with a minimum of hinderance in this movement.

Therefore, it is a primary object of this invention to provide a mounting assembly for drivingly associating a rotatable element to a shaft, the assembly providing for transmission of dampened torsional loads while maintaining freedom for the armature to move axially with respect to the shaft. More particularly the assembly provides a pair of nested hub members with means maintaining a controlled pre-load force on said members urging them to one relative axial position while having means providing torsional flexibility between the hub members so as to transmit dampened torsional loads and limit the transmission of radial loads to no more than 10% of the maximum torsional load to maintain axial freedom. A particular feature of this object is the incorporation of resilient blocks or cushions between generally radially directed interleaved teeth or projections on the nested hub members, the cushions being effective to dampen the torsional fluctuations between the hub members and by their distortion under stress tend to radially align the hub members and thereby limit the transmission of radial loads.

An additional problem is presented in that the engineering specifications typically used for the compressor internal parts, such as vanes, may vary. Eccentricities, mis-alignment, along with assembly or dynamic loads, must, in some cases, be compensated by the clutch device. Accordingly, another object of this invention is to provide a radially and torsionally flexible hub assembly for an armature of an electro-magnetic device such as a clutch or brake, the hub assembly compensating for dimensional differences between the connected parts without otherwise affecting the performance of the clutch device or driven member.

A specific object of this invention is to provide a flexible hub assembly having nested and jointly journaled hub members provided with generally radially directed projections which act as interleaved teeth for imparting rotative drive between the hub members, resilient cushions are disposed between the side walls of said teeth to provide a resilient transmission of torsional loads while limiting the transmission of radial loads due to eccentricities and mis-alignment, and other resilient means (in the form of a wave washer, a belleville spring, or coiled compression springs) are provided to urge one of the hub members to an extreme axial position relative to the other hub member for retracting the armature carrying the hub member, each of the hub members having conical surfaces effective to be engaged in the extreme axial position as urged by said other resilient means for positively and mechanically maintaining concentricity between the hub members.

This invention consists of the novel constructions, arrangements, and devices to be hereinafter described and claimed for carrying out the above stated objects and such other objects as will appear from the following description of a preferred form and certain alternative suggestions of the invention, illustrated with reference to the accompanying drawings, wherein:

FIGURE 7 is a greatly enlarged elevational view of one of the resilient blocks of FIGURE 1;

FIGURE 8 is a side elevational view of the structure shown in FIGURE 7;

FIGURE 9 is a greatly enlarged elevational view of the wave washer of FIGURE 1;

Figure 13:
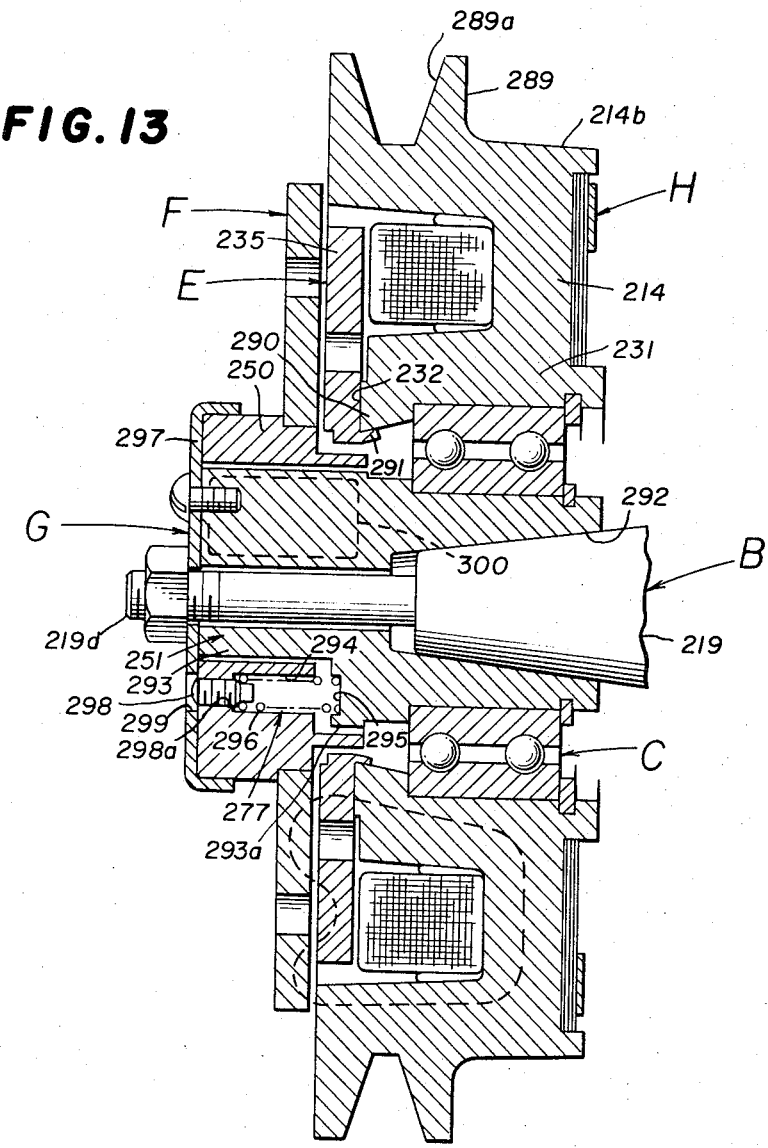

FIGURE 9a graphically illustrates the spring characteristics of the structure of FIGURE 9;

FIGURE 10 is a side elevational view of the structure shown in FIGURE 9;

FIGURE 11 is an enlarged end view of another form of resilient cushion or block that may be utilized in the hub assembly;

FIGURE 12 is an enlarged end elevational view of a cushion that may be utilized for reverse drive conditions; and FIGURE 13 illustrates an alternative construction of the hub assembly.

Figure 1:
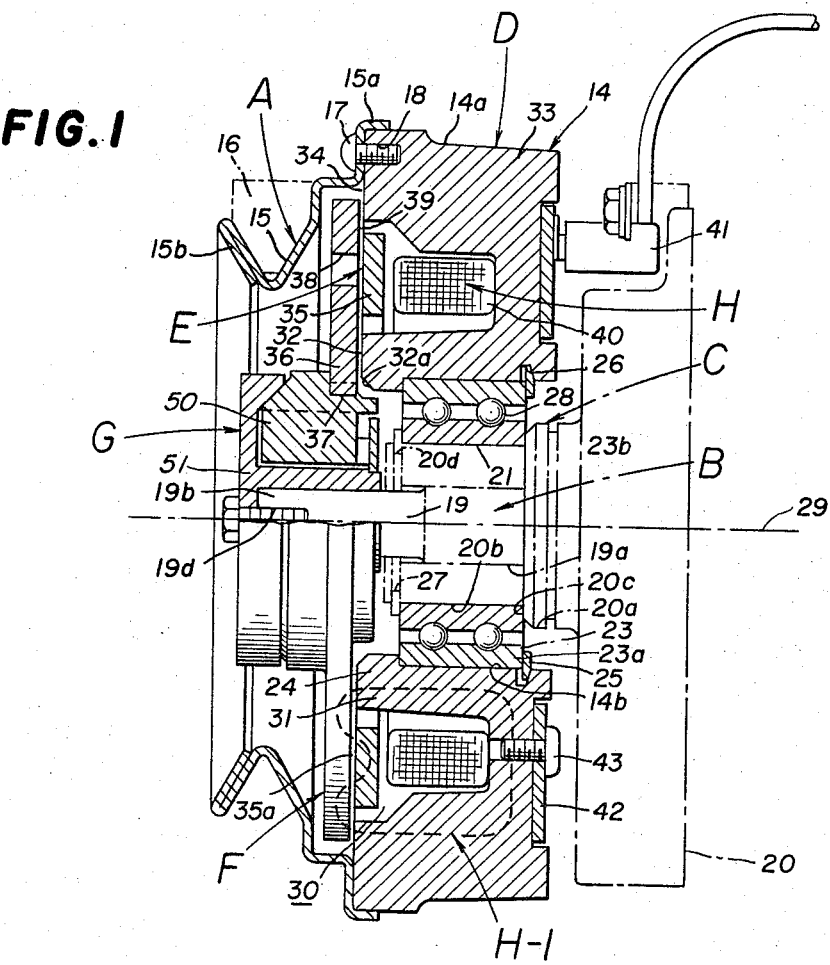
FIGURE 1 is a central sectional elevational view of a device embodying the principles of this invention.
Figure 2:
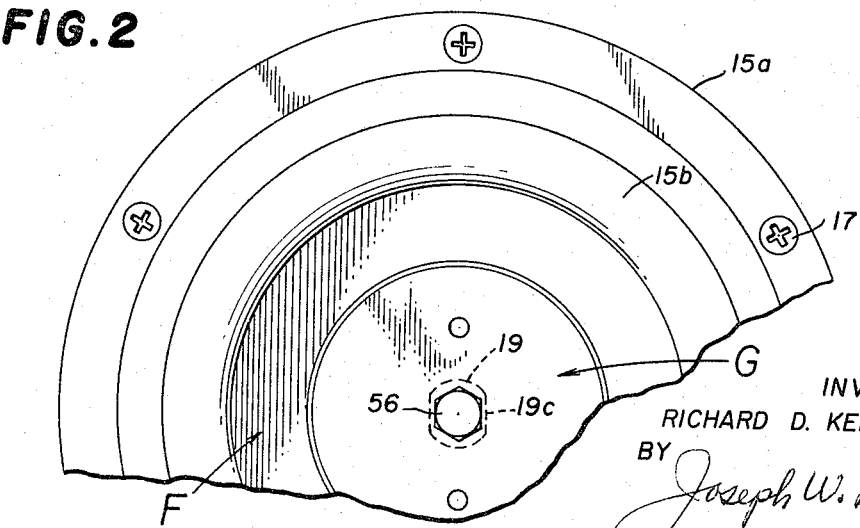
FIGURE 2 is a fragmentary elevational view of the structure of FIGURE 1.

Turning now to the drawings, and particularly to FIGURES 1 and 2, there is illustrated a preferred embodiment of an electro-magnetic clutch device, designated D, and in its broad aspects comprises a rotative input means A, and a rotative output means B, each supported for rotation relative to each other by a support means C including a bearing and an extension of the compressor housing. Ferro-magnetic inter-engageable elements E and F are provided, element E being drivingly associated with the input means and element F drivingly asociated with the output means by way of a flexible mounting assembly G; an electro-magnetic actuator H is carried by the element E and is effective to selectively stimulate the flux path H–1 magnetically attracting the elements together and thereby promoting conjoint rotation.

In more particularity, the rotary input means A comprises an annular sheet metal bracket 15 formed with an annular shoulder 15a for mating with and attaching to a core ring 14 which comprises a part of the interengageable element E; bracket 15 has an off-set and radially inwardly disposed V-shaped flange 15b for receiving rotative power from a belt 16 or other suitable means conforming to the V-shaped flange. The bracket 15 is secured to the core ring by a plurality of fasteners 17 extending into threaded openings 18 within the core ring 14. Alternative variations of the input means may be provided; for example, the core ring element can be formed with a radially outwardly extending integral projection which carries a V-shaped groove effective to receive the belt at that position. This varies the diameter of rotation of the belt at the device D and thereby the speed of the input means.

The output means B comprises a shaft 19 having one end 19a which extends into a compressor housing 20 and is drivingly associated with the integral parts thereof; shaft end 19b carries the flexible mounting assembly G and is provided with diametrically opposite flat sides 19c for keying the shaft to the mounting assembly and has a central threaded bore 19d.

The support means C comprises a sleeve extension 20a from the compressor housing 20 and has an outer cylindrical surface 20b which is defined between an annular shoulder 20c at one end and a groove 20d at the other end. The sleeve has an internal cylindrical wall 21 through which the shaft 19 extends for entering the compressor housing 20; a bearing 23 is interposed between the inner periphery 14b of the core ring and the outer surface 20b of the sleeve extension 20a. The bearing has an outer race 23a axially restrained by an annular shoulder 24 depending from the periphery 14b of the core ring and also by a suitable snap ring 25 received in a groove 26 formed in said periphery wall 14b. The inner race 23b of the bearing is axially restrained by the shoulder 20c and by a snap ring 27 received in the groove 20d. Suitable bearing elements such as rollers 28 are interposed between the races.

Element E comprises in part the core ring 14 formed of ferro-magnetic material and having a generally U-shaped cross section (as shown in FIGURE 1) effective to define an internal channel or space 30. The radially inner leg 31 of the U-shaped cross section is supported by the means C and terminates with a face 32 lying in a radial plane with respect to the axis 29 of rotation and has a conical chamfer 32a at an inner portion. The radially outwardly leg 33 of the U-shaped cross section carries the input means and has an outer periphery 14a and a terminal face 34 which cooperates as a magnetic pole. An annular ring 35 is nested between the terminal end portions of legs 31 and 33 and is carried by the radially outer leg 33 with spaced portions therebetween to define a multiple flux path circuit H–1 in cooperation with the element F. The ring 35 has a face 35a lying in a plane common with the faces 34 and 32. Ring 35 constitutes the other magnetic pole of the core ring.

Element F comprises a flat plate or armature 36 having a central octagonal wall 37 adapted to be fitted to a complementary shaped surface on the flexible mounting G for providing a driving connection therebetween. Plate 36 has a plurality of circumferentially spaced arcuate slots 38 effective to aid in directing a multiple flux circuit which inter-weaves with the core ring 14 and ring 35; face 39 of the armature is adapted to frictionally engage the faces of element E.

The electro-magnetic actuator H comprises a coil 40 nested in the channel 30 of the core ring and selectively receives electrical power from a source (not shown) by way of a collector ring and brush assembly 41 interconnected with the coil through conductor plate 42 and leads (not shown) held by attaching screws 43.

The flexible mounting G comprises a pair of nested members 50 and 51 jointly journaled upon the shaft 19. Member 50 will hereinafter be referred to as the radially outwardly disposed hub member which has an octagonal recess 52 adjacent one side 50a and defined in the outer surface 50b thereof for receiving the inner octagonal wall 37 of element F. Element F is secured for rigid driving relationship with the outer hub member 50 by circumferentially spaced cold working deformations 53. The other member 51 will hereinafter be referred to as the radially inwardly disposed hub member which is provided with an internal opening 54 having flat sides 51a and 51b complementary to the flat sides 19c of the shaft 19 for thereby effecting a keyed or driving relationship therebetween. Opening 54 does not extend entirely through the hub member and thereby provides an end wall 55 effective to abut the end of shaft 19 to maintain axial rigidity; a threaded stud 56 extends through a smaller opening 57 in wall 55 and into the threaded opening 19d of the shaft.

Hub member 51 has a ring body 51a with an annular radially extending flat wall 58 at one end; a recess 59 is provided at the opposite end thereof. Wall 58 is formed with an annular shoulder 60 at its outer periphery and has a radially inwardly facing conical surface 61. A complementary conical surface 62 is defined on the outer hub member 50 for providing a positive mechanical alignment between the surfaces 61 and 62 when inter-engaged.

The recess 59 at the opposite end of member 51 is effective to receive a retainer 63 formed as a flat ring. The outer periphery 63a of the retainer is dimensioned so that it lies slightly radially inward of the inter-section of the conical surface 61 and the wall 58.

The outer hub member 50 is jointly journaled with the inner hub member 51 on shaft 19 by virtue of a first resilient means 65; the resilient means 65 is interposed between the inner and outer hub members for maintaining a flexible journal therebetween. To this end, a series of projections or teeth 66 extend radially outwardly from the cylindrical surface 67 of the inner hub member and are interleaved with a complementary series of teeth or projections 68 extending radially inwardly from the inner cylindrical surface 69 of the outer hub member. A plurality of variable cavities 70 is thereby formed and defined between side walls 71, 72, 73, and 74 of adjacent teeth, in cooperation with the inner and outer cylindrical surfaces 67 and 69 of the hub members, as well as the inner surface 58a of the end wall 58 and retainer 63. Although the axial length 75 of all the respective teeth is approximately the same, the conical surfaces between the two members are related so that the ends 68a of the teeth 68 will not bottom or abut the surface 58a of wall 58 or inner hub member (see FIGURE 4). Furthermore, the distance 76 between the inner face 63b or the retainer 63 and the surface 58a of wall 58 is considerably greater than the axial dimension 75 so that limited sliding movement may be permitted between the hub members as well as accommodate a second resilient means 77 for providing an axial bias between said members.

Figure 5:
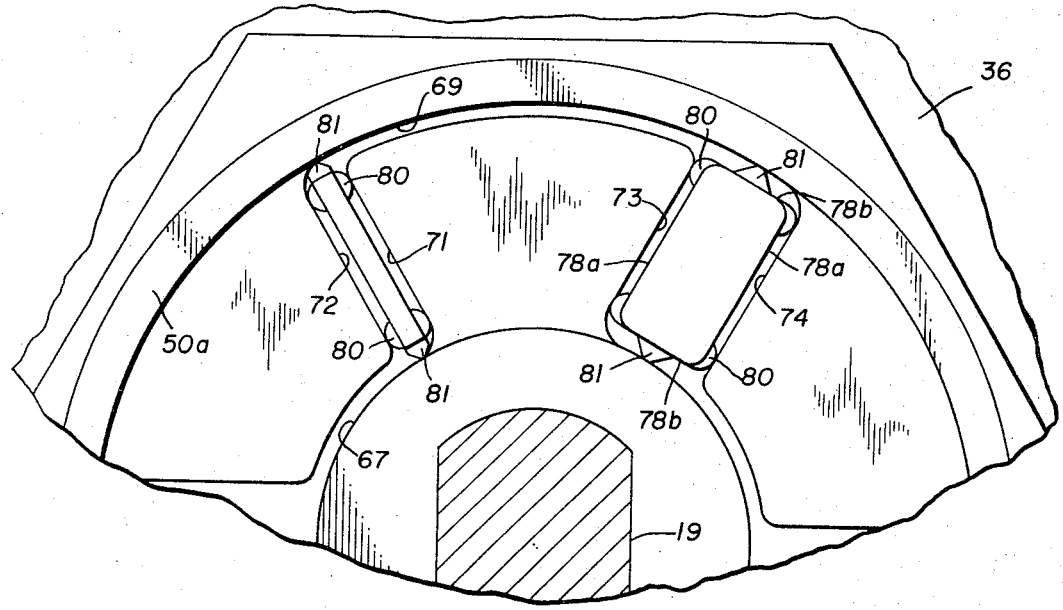
FIGURES 5 and 6 are enlarged end views of the hub members illustrating the condition of the resilient blocks or cushions respectively in the unstressed or non-drive condition and in the stressed or drive condition of the hub assembly.
Figure 6:
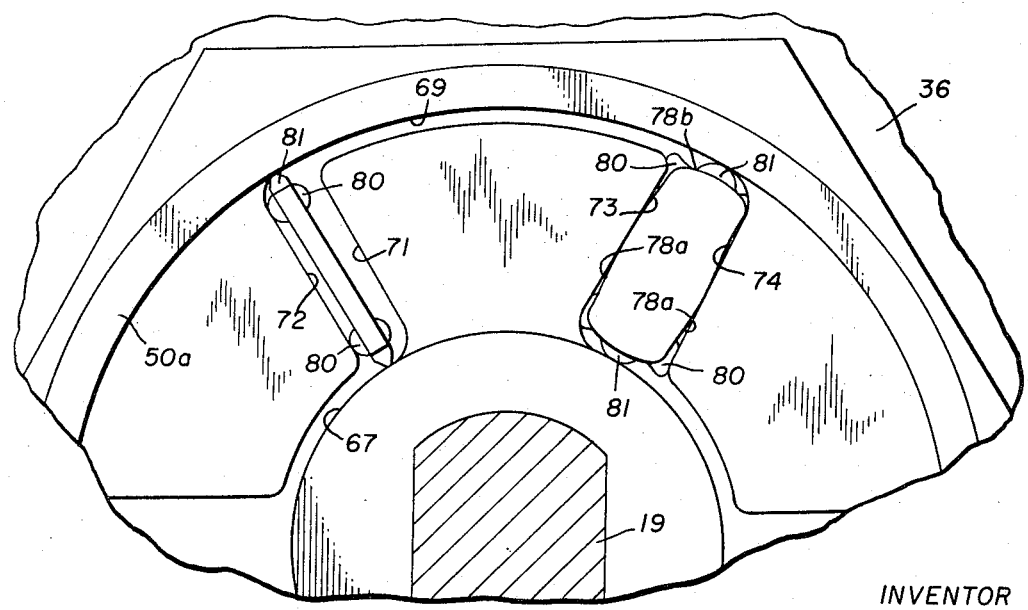

To operate the compressor, rotative drive must be transmitted in a counter-clockwise direction, as viewed in FIGURES 5 and 6, and therefore only certain sides of the interleaved teeth 66 and 68 will be driving or working sides. It is between these sides 71 and 72 that the first resilient means 65 is interposed to provide a cushioned transmission of radial and torsional loads. The teeth side walls 71–74 are generally disposed but more precisely lay in planes which are chordal with respect to the axis 29 of rotation of the device; this enables the first resilient means 65 to be more uniformly compressed throughout its radial extent during the drive condition. Each of the teeth occupy a general arc of about 50 degrees between side walls thereof.

The first resilient means 65 in particularly comprises a plurality of blocks or resilient cushions 78 which may be comprised of material such as relatively stiff rubber. The blocks are primarily rectangular in configuration and have an axial dimension 79 approximately equal to the teeth dimension 75; each block has integrally molded ridges 80 extending substantially throughout the axial extent 79 and are exposed along the upper and lower edges of each of the sides 78a which are to engage the working walls of the teeth. Ridges 80 are gently rounded at their outer extremity. Elongated ridges 81 are also formed along the central portion of the upper and lower walls 78b which are radially directed and effective to contact respectively the inner and outer surfaces 67 and 69 of the hub members. Ridges 81 are somewhat pyramidal in cross section, the ridges 80 and 81 provide a spaced relationship between the walls of the variable cavities and the blocks whereby the rubber may distort under compression to flexibly absorb torsional vibrations of the cavity in the drive condition. Internal openings 82 extend between opposite sides 78a of each block for the purpose of internal changes of shape.

In cases where reverse rotation in the clockwise direction (as viewed in FIGURES 6 and 5) may occur upon dis-engagement of the clutch, additional blocks or resilient cushions 83 may be installed in cavities defined between the non-working sides 73 and 74 of the teeth of the respective hub members, thereby reducing any tooth clatter which may be present and objectionable. The reverse rotation cushions 83 may have a thinner silhouette, as shown in FIGURE 11; the cushions 83 have generally the same ridges and rounded contours as in the drive cushions 78.

Certain criteria must be considered in the structural design of the second resilient means 77 employed for providing an axial preload force on one of the hub members to retract the armature upon de-energization of the electro-magnetic clutch. Such means should be (a) capable of providing a relatively long axial travel, (b) possess a relatively low hysteresis in its forward and return movements, and (c) maintain a low spring rate, preferably zero rate, throughout its operative travel in the assembly. The low hysterisis of the spring is necessary as dictated by necessary design limits illustrated, for example, in FIGURE 9a. In the clutch engaged and dis-engaged conditions the maximum spring force which is permitted is dictated by the amount of force that can be tolerated in opposing the magnetic attraction of the armature for satisfactory operation of the clutch. The minimum spring force at the released and engaged conditions is dictated by that which is necessary to slidably move the armature and outer hub member to its proper position. It will be noted that these maximum and minimum spring force points almost require a spring curve which is generally flat. To meet these needs, a wave washer 84 has been selected for the preferred embodiment. As shown in FIGURE 9a, the wave washer has a spring characteristic which, during the dis-engaging movement, follows approximately the same path that the spring undergoes during the engaging movement, thereby resulting in a relatively low hysterisis. The washer has a low spring rate and, by proper definition of the convolutions, has a good axial travel.

In order to provide for axial travel of the outer hub member 50 on the inner hub member 51 for purposes of retraction of the armature element F upon deenergization of means H, the second resilient means 77 is provided. Means 77 comprises, in the preferred embodiment, a wave washer 84 having a generally annular configuration defined with equi-circumferentially spaced portions 85 lying in a common plane adapted to fit and react against the inner side 63a of the retainer 63. Spanning arcuately between these flat portions are convolutions 86 which are deformed outwardly from the plane adapted to engage the ends 68a of the teeth 68 of the radially outer hub member. The washer has inwardly extending fingers 87 effective to fit against the side of the shoulder defined by recess 59 in the cylindrical surface 67 of the inner hub member and cooperates with the retainer 63 to maintain an axial reaction.

Other variations to that of the preferred embodiment for the second resilient means 77 may be employed; for example, a belleville spring may be used in place of the wave washer which, although having slightly less capabilities for axial travel, does possess the characteristics of low hysteresis and relatively low spring rate. Also coiled compression springs may be utilized between hub members redefined for receiving such springs; this variation will be more fully discussed below in connection with the alternative clutch embodiment of FIGURE 13.

The alternative clutch embodiment of FIGURE 13, is illustrated to show the wide scope that should be attributed to features of this invention. The alternative embodiment has similar reference numbers to that of the preferred embodiment prefixed by 2 wherein the parts are the same. Core ring 214, instead of employing a reduced diameter metallic bracket for a drive belt 213, has an integral annular flange 289 extending radially outward from surface 214b and is provided with V-shaped groove 289a for receiving the belt. The lower leg 231 of the core ring has a depending shoulder 290 provided with an outwardly facing surface 232 against which is received a ferro-magnetic ring 235 adapted to cooperate as a magnetic pole with the core ring; ring 235 is positioned against the shoulder 290 and has an annular lip 291 swagged radially against the inner portion of the shoulder 290 to provide a driving connection therebetween.

Mounting means C is effective to rotatively carry the core ring 214 upon a sleeve extension of the inner hub member 251. The inner hub member in turn is provided with a conical bore 292 effective to mate and align with the end of the shaft 219 having a complementary conical surface for mounting the inner hub member; the shaft 219 has a threaded extension 219d for coupling a retainer plate 297 against the outer side of the inner hub member (thereby bolting hub member 251 to the tapered shaft 219) and effective to act as an axial limit for the outer hub member; the retainer plate having an outer periphery provided with an annular flange effective to envelop the end of the outer hub member.

The inner hub member is characterized, in this embodiment, by lack of a positive concentric aligning means, is primarily comprised of an annular sleeve body 293 having an annular radial wall 293a at the inboard side thereof. The outer hub member is generally similar to the outer hub member of the preferred embodiment in that it has a primary ring body 250 provided with a recess for receiving the octagonal inner wall of the armature element F.

Each of the hub members have a plurality of equi-circumferentially aligned bores 294 and 295 provided therein, the axis of said bores extending parallel to the axis of rotation of the device and arranged in opposed pair for receiving coil compression springs 296 which may act as an axial preload force in urging the outer hub member to a retracted position against the retainer plate 297. In this embodiment, the second resilient means 277 has an adjustment feature wherein a set screw 298 for each of the springs 296 is threadably received by smaller openings 298a in the inner hub member; access to the set screws is gained through openings 299 in the retainer plate 297. Each set screw 298 has a conical surface surrounding an extended nose effective to bear against the end of a spring 296 and by adjustment within the threaded openings 298a may apply greater or less compressive force on the spring to vary the reaction force thereby. Cushions 300, for the alternative embodiment, may simply have flat walls 301 on opposite driving sides effective to engage the driving side walls of the teeth; each cushion has top and bottom portions 302 provided with converging surfaces 302a to define edges 302b effective to contact the inner and outer peripheral surfaces of the respective outer and inner hub members during the unstressed condition of the device. The edge contact progresses into a more general surface contact under the drive condition as the cushions are distorted radially to provide radial alignment between the hub members.

Figure 4:
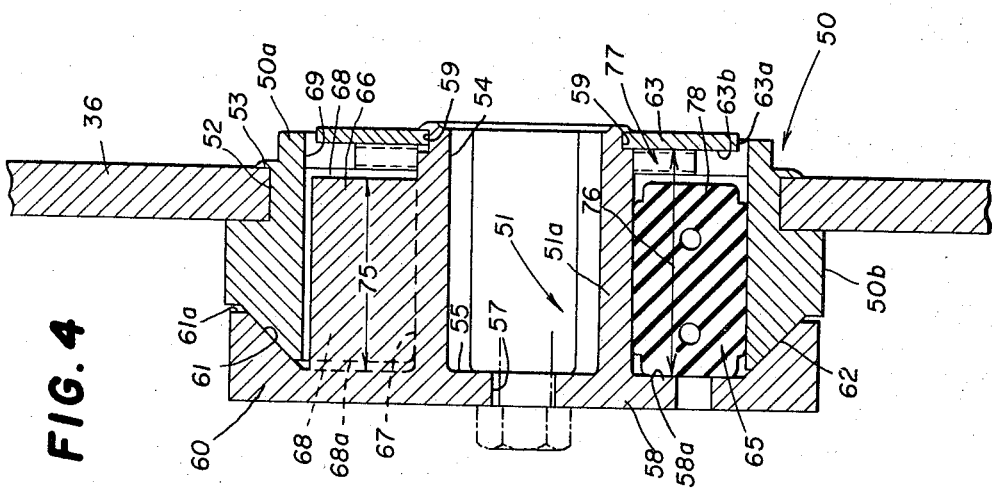
FIGURE 4 is an enlarged sectional elevational view of the entire hub assembly of this invention, forming a part of the clutch device as shown in FIGURE 1.

For purposes of describing the operation of the device, the non-drive or dis-engaged condition of the electro-magnetic clutch may be assumed as the starting condition. In such condition, the cushions 78 appear, in cross section, as shown in FIGURE 5 and occupy substantially 80–90% of the available space of the drive cavities. The ridges 80 can be clearly seen as spacing the side walls 78a of the cushions from the driving side walls 71 and 72 of the interleaved teeth and similarly the upper and lower ridges 81 can be seen as spacing the portions 78b from the peripheral walls 69 and 67 of the hub members; there is merely a line contact between the ridges 81 and 80 and the respective cavity wall in the disengaged condition. The inner hub member 51 is urged to the most extreme left-hand axial position, as shown in FIGURE 4, by the wave washer 77 in the disengaged condition and the positive mechanical inter-engaging conical surfaces 61 and 62 effective to align the hub members concentrically about shaft 19. In this condition, radial and angular freedom is substantially prevented by the positive aligning surfaces 61 and 62. However, a slight chamfer 61a is provided at the terminal edge of the conical surface 61 of the inner hub member whereby a very small but limited degree of angular adjustment may occur between the hub members in the disengaged condition.

Figure 3:
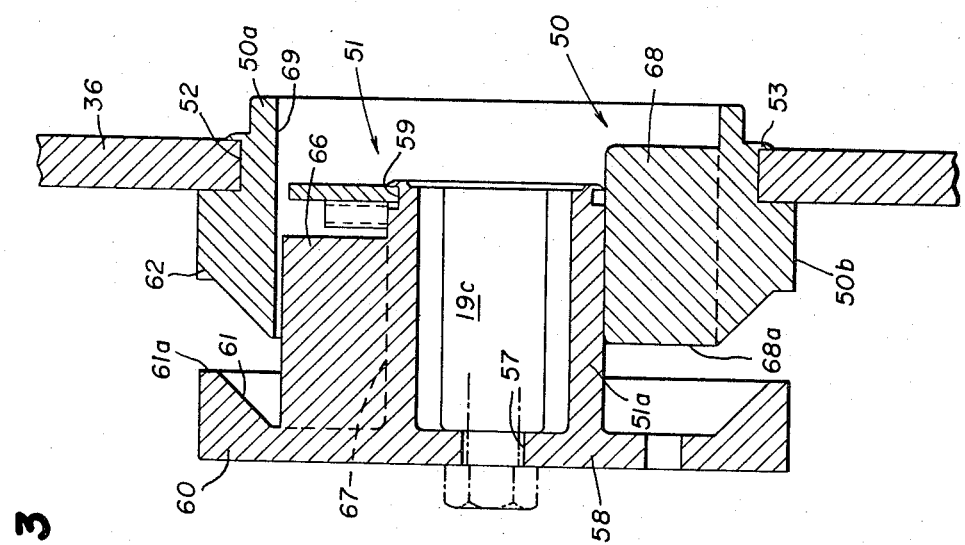
FIGURE 3 is an exploded view of enlarged sections of the hub members forming a part of the structure of FIGURE 1.

Upon energization of the means H, the armature element F is magnetically attracted to the core ring element overcoming the preload or bias of the second resilient means 77 to slide the outer hub member axially to the right, as viewed in FIGURE 3; the positive mechanical aligning surfaces 61 and 62 are thereby released. During such axial movement, frictional drag is substantially reduced by the definition of rounded ridges 80 and 81 on the cushions and radial flexibility of the cushions tending to maintain the outer hub member centered with respect to the inner hub member during such axial movement thereby compensating for eccentricities or misalignment which would increase radial loads causing jamming of axial movement. During the drive condition, the cushions 78 are compressed to a general condition where they occupy approximately 95% of the available drive cavity; with residual flexure and space available during drive, the cushions can absorb torsional fluctuations and eccentricities from the compressor shaft both during the axial travel to the drive condition and in the drive condition. Radial loads are limited to no more than 10% of the maximum transmitted torsional load for which the device is designed. This limitation of radial loads, in cooperation with its ability to transmit torsional loads, maintains the axial freedom necessary for retraction and movement of the armature with a simplified preload resilient means.

The hub assembly of this invention is characterized particularly by its simple configuration and thereby inexpensive manufacture. Assembly and disassembly for possible replacement of parts is done with ease, thereby rendering a readily serviceable item.

While a certain preferred embodiment and alternative suggestions of the invention has been specifically disclosed, it is understood that the invention is not limited thereto, as variations will readily be apparent to those skilled in the art, and the invention is to be given the broadest possible interpretation within the terms of the following claims.

What is claimed is:

1. A mounting assembly for use in drivingly connecting an element to a shaft, comprising: a pair of nested hub members jointly journalled on said shaft, one member being rotatably coupled to said shaft and the other member being rotatably coupled to said element, said hub members being nested with provision for limited relative rotative movement therebetween and limited axial sliding movement therebetween, independent resilient means interposed between portions of said hub members effective to provide a cushioned torsional connection between said hub members to transmit a torsional load while limiting the transmission of radial loads between said hub members to no more than 10% of the maximum transmitted torsional load whereby axial sliding freedom between the hub members is maintained.

2. A mounting assembly as in claim 1, which further comprises positive means for concentrically aligning said hub members at one extreme position of the limited axial movement permitted between said hub members.

3. A mounting assembly as in claim 1, which further comprises means normally urging said members to one extreme position of said limited relative axial movement therebetween.

4. A mounting assembly as in claim 3, in which said axial urging means comprises a resilient convoluted washer having an annular configuration.

5. A mounting assembly as in claim 1, in which said hub members each have at least one generally radially directed wall, and said rotatively resilient means particularly comprises at least one resilient block loosely interposed between said generally radially directed walls for transmission of torsional forces therebetween, said blocks being effected to distort upon being compressed between said walls for limiting said radial load transmission.

6. A mounting assembly as in claim 5, in which said resilient block has at least one integral ridge extending outwardly from a side of said block facing one of said generally radially directed walls of said hub members, said ridge being effective to provide space for expansion and distortion of said block during the torsional drive condition of said hub members and also to localize contact between the block and walls during axial sliding movement between said hub members.

7. A mounting assembly as in claim 5, in which said block has one or more internal openings for permitting internal distortion during compression without the torsional drive condition of said hub members.

8. A clutch device as in claim 1, in which said hub members having radially directed interleaved projections, each projection having side walls extending in planes parallel to but offset from the axis of rotation of said device; said resilient means comprising cushions disposed between and in contact with at least certain of said side walls to provide a resilient rotary connection therebetween while permitting axial freedom, and other resilient means normally biasing said hub members to a more complete nested relationship, said hub members also having circumferentially extending walls cooperating with the side walls of said projections to define a plurality of equispaced internal variable cavities, said resilient cushions being effective to distort under torsional stress from said projection side walls and thereby more fully contact the circumferential walls of said hub members while limiting the transmission of radial loads.

9. A clutch device as in claim 8, in which said resilient cushions each have a shape provided with generally flat side walls effective to mate and engage with the side walls of said projections and have radially directed portions terminating in an edge parallel to the axis of rotation and effective to contact said circumferential walls of said hub members, said edge contact progressing into a surface contact upon torsional stress of said cushions.

10. A mounting assembly for use in drivingly connecting an annular element to a co-axially arranged shaft, comprising: a pair of nested hub members jointly journaled on said shaft, one member rotatably coupled to said shaft and the other member rotatably coupled to said element, said hub members each having generally radially directed and interleaved projections adapted for limited relative rotative movement therebetween as well as a limited axial sliding movement therebetween, said projections and hub members cooperating to define cavities therebetween which vary upon relative rotational movement between said hub members, a resilient cushion disposed in at least one of said cavities for providing a cushioned rotative connection between said hub member projections to transmit a torsional load, said resilient cushion occupying up to 80% of the cavity space during the unstressed condition of the cushion in the non-torsional drive condition of the assembly, said cushion flexing and distorting under torsional load during the drive condition of the said assembly to occupy a greater volume of said reducing cavity while distorting radially to transmit a radial load no greater than 10% of the maximum transmitted torsional load, thereby maintaining axial sliding freedom between the hub members.

11. A mounting assembly as in claim 10, in which said cushion occupies no more than 95% of the cavity volume during the drive or torsional load condition of the mounting assembly, thereby retaining a residual flexure of the cushion even during the maximum torsional drive condition.

12. A clutch device comprising rotary input means and rotary output means; ferro-magnetic inter-engageable first and second elements, with the first element drivingly connected to said input means; an electro-magnetic actuator carried by one of said elements to provide for a selective conjoint rotation of the elements; and flexible connecting means drivingly associating the second of said elements with the output means, support structure for said connecting means comprising a first member fixed to said output means and a second member carried on said first member with limited rotational and axial freedom, said members having axially and radially interleaved portions, first resilient means normally urging said members to one axial position and a second resilient means independently interposed between said interleaved portions, said connecting means cooperating with said first and second members to maintain a radial and rotative cushioned relationship therebetween.

13. A mounting assembly for use in drivingly connecting an element to a shaft, comprising: a pair of nested hub members jointly journaled on said shaft, one member rigidly coupled to said shaft and the other member rigidly coupled to said element, said hub members being nested with provision for limited relative rotative movement therebetween and limited axial movement therebetween, said one hub member having axially spaced end walls between which the other of said hub member is adapted for limited axial movement, first resilient means interposed between said hub members to effect a cushioned rotative connection therebetween to transmit a torsional load while limiting the transmission of radial load between said hub members to no more than 10% of the maximum transmitted torsional load, and second resilient means reacting against one end wall of said one hub member to normally bias the other of said hub member toward the other end wall of said one hub member.

14. A mounting assembly as in claim 13, in which said second resilient means comprises a wave washer having circumferential portions lying in a plane and effective to contact said one end wall of said one hub member and thereby provide a reaction for other stressable portions of said washer.

15. A mounting assembly as in claim 13, in which said second resilient means comprises means for adjusting the degree of biasing force in the axial direction.

16. A clutch device comprising: rotary input means and rotary output means; first and second ferro-magnetic inter-engageable elements with the first element drivingly associated with said input means; an energizable electro-magnetic actuator carried by one of said elements; and means drivingly connecting said output means with the second of said inter-engageable elements, said last named means providing a radially and torsionally flexible connection therebetween while providing an axial bias on said second element for separating said first element upon de-energization of said actuator, supporting structure for said flexible connecting means which comprises first and second portions, one portion being positively drivingly connected to the output means and the other member being positively drivingly connected to said second inter-engageable element, said portions cooperating to define at least one internal variable chamber provided with at least one pair of spaced generally radially directed walls, one wall being on one of the members and the other wall being on the other of said member, and said flexible connecting means being independently disposed in said cavity to effect transmission of rotative drive between said cavity walls.

17. A clutch device as in claim 16, in which said members are annular and jointly journaled about said output means, and in which there are a plurality of internal cavities equi-circumferentially spaced about said members whereby upon relative rotative movement between said members caused by operation of said actuator, said resilient means is torsionally stressed and thereby caused to distort radially against the other walls of said cavities for providing a limited transmission of radial loads between said member limited to a maximum of 20% of the maximum transmitted torsional load.

References Cited by the Examiner

UNITED STATES PATENTS

| 1,697,065 | 1/1929 | James | 64—27 |
| 2,698,679 | 1/1955 | Vernhes | 192—84 |
| 2,953,277 | 9/1960 | Gilbert | 192—84 |
| 3,138,232 | 6/1964 | Gerber et al. | 192—89 X |
| 3,205,989 | 9/1965 | Mantey | 192—55 |

DAVID J. WILLIAMOWSKY, *Primary Examiner.*

A. T. McKEON, *Assistant Examiner.*